Feb. 19, 1952  S. B. RENNERFELT  2,586,260
VARIABLE-SPEED CHANGING GEAR
Filed Nov. 13, 1950

INVENTOR:
Sven Bernhard Rennerfelt,
BY: Pierce, Scheffler & Parker,
ATTORNEYS.

Patented Feb. 19, 1952

2,586,260

UNITED STATES PATENT OFFICE 2,586,260

VARIABLE-SPEED CHANGING GEAR

Sven Bernhard Rennerfelt, Goteborg, Sweden

Application November 13, 1950, Serial No. 195,376
In Sweden November 14, 1949

5 Claims. (Cl. 74—200)

The present invention relates to a variable speed changing gear of the type in which two friction discs located substantially in a common plane and secured to separate shafts and having a thickness decreasing towards the periphery cooperate with two friction wheels which are forcibly pressed against the friction discs and are rockably mounted on a gear shaft displaceable between said separate shafts. The object of the invention is to provide an improved construction in which the pressure between the friction wheels and the friction discs varies according to the momentum of the shafts.

Figure 1:
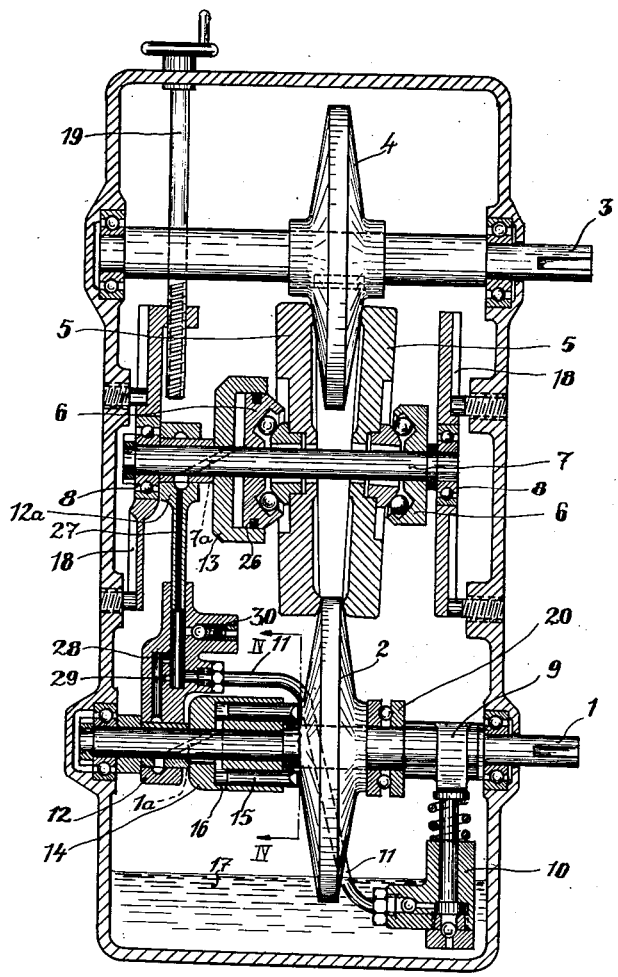
Figure 4:
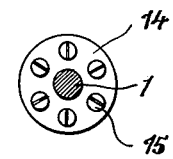
Figure 3:
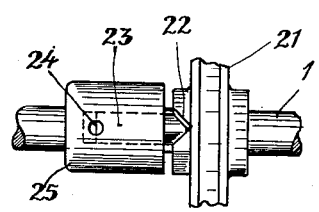
Figure 2:
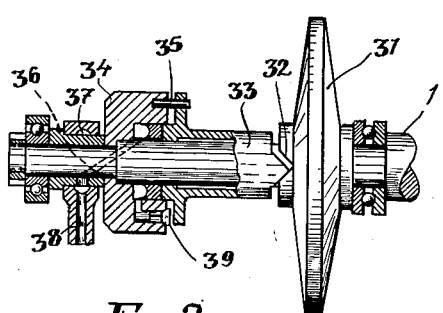

Some embodiments of the invention are illustrated in the accompanying drawing, in which:

Fig. 1 is a section through a gear according to the invention. Fig. 2 is a section through a detail of a gear according to another embodiment, and Fig. 3 shows in a similar way as Fig. 2 a modified form of detail of Fig. 1. Fig. 4 is a section, taken on line IV—IV in Fig. 1.

Referring to Fig. 1, reference numeral 1 denotes the driving or primary shaft of the speed changing gear on which shaft there is rotatably mounted a friction disc 2. Numeral 3 denotes the secondary or driven shaft, having keyed onto it a friction disc 4, both friction discs 2 and 4 having a thickness decreasing from the centre and outwards. Two friction wheels are rockably mounted by means of ball bearings 6 on an intermediate shaft 7, which is journaled in ball bearings 8 in a diagrammatically shown frame 18, which is displaceable between the shafts 1 and 3 by means of a screw 19 in order to vary the gear ratio.

On the shaft 1 there is provided a cam 9, which actuates an oil pump 10 of the piston type, which by means of a conduit 11 is connected to a house 12 which is secured to the gear casing and surrounds the shaft 1 in order to convey oil under pressure to a channel 1a in the rotating shaft and from which also leads a conduit comprising a tube 27 which is sliding telescopically in a bore in the house 12 and projects from a house 12a which conveys oil to a channel 7a in the shaft 7.

The channel 1a opens in a cavity in a member 14 which is keyed onto the shaft 1 and in which are slidably mounted six pistons 15 the outer ends of which being formed like wedges cooperating with corresponding recesses in the friction disc 2. It will be understood, that the pistons 15 tend to move inward in their bores when the shaft 1 is rotating. In one of the bores there is provided an opening 16 through which oil can escape to the oil store 17 at the bottom of the gear casing and which opening is controlled by the pertaining piston.

The channel 7a opens in a cylinder 13 coaxial with and keyed onto the shaft 7 in which cylinder slides a piston 26 supporting one of the ball bearings 6.

When the shaft 1 is rotated the pump 10 delivers oil through the conduit 11 to the house 12 and channel 1a. As the oil at first can escape through the opening 16 the pistons 15 can easily move inward until the opening 16 is at least partially covered by its piston. Then the oil pressure increases until an equilibrium is attained in which the axial pressure from the disc 2 exerted upon the pistons 15 is balanced by the oil pressure in the cavity behind said pistons. In this position of the pistons 15 and disc 2 is forced to rotate together with the shaft 1 and it is evident that the value of the oil pressure corresponds to the momentum which is necessary for rotating the disc 2.

As the cylinder 13 communicates with the house 12 the piston 26 tends to move outward, thereby pressing the friction wheels 5 against the discs 2 and 4, when the oil pressure increases. The force is dependent on the oil pressure and thus varies according to the momentum.

If the shaft 1 is driven with a constant momentum the pressure between the friction discs and friction wheels must be greater when the wheels make contact with the disc 2 near its centre than when the contact occurs near the periphery of said disc. On its way from the conduit 11 to the opening 16 the oil has to pass an opening 28 which is located such as to be covered by the tube 27 when the shaft 7 is moved to its end position nearest the shaft 1. The oil then must pass through a throttling opening 29 whereby the oil pressure in the cylinder 13 becomes greater than the pressure in the cavity in the member 14.

In Fig. 1 there is shown a safety valve 30 which is controlled by the slidable tube 27 in a similar way as the opening 28 so that it is uncovered when the shaft 7 is moved toward its upper end position in which the shaft 3 is driven with high speed.

Fig. 4 is a section on line IV—IV in Fig. 1 and shows an end view of the member 14 with its six pistons 15 and their wedge-formed ends, the edges of the wedges being directed radially. In Fig. 3 is shown a modified form of the member 14 in Fig. 1 comprising a member 25 with only one piston 23 corresponding to that piston in Fig. 1 which controls the opening 16. In Fig. 3 the piston controlled opening bears numeral 24. The outer end of the piston 23 is formed like a wedge cooperating with sloping faces 22 in a recess in the hub of the disc 21 (corresponding to disc 2 in Fig. 1).

In Fig. 2 is shown another embodiment of the driving parts of the gear. The peripherally spaced pistons 15 in Fig. 1 are here substituted by a piston 33 having a ring-shaped cross-section and being slidable in a cylinder 34 keyed onto the shaft 1. The cylinder 34 communicates with the oil pump through channels 36, 37 and 38. A pin 35 prevents the piston 33 from rotating relatively to the cylinder 34.

The outer end of the piston 33 is provided with wedge-shaped projections cooperating with corresponding recesses 32 in the friction disc 31 (corresponds to disc 2 in Fig. 1). At increasing momentum the piston 33 moves inward and thereby a flange on the piston actuates a valve 39 so that this valve tends to close an opening leading oil from the cylinder 34. The oil flow is thus throttled and the oil pressure increases.

What I claim is:

1. A variable speed changing gear comprising in combination, a casing, a primary shaft and a secondary shaft mounted in said casing, a friction disc on said primary shaft, a second friction disc on said secondary shaft, said discs being located substantially in a common plane and having a thickness decreasing towards the periphery, a gear shaft located between said primary and said secondary shaft in parallel relation thereto and being mounted in a frame displaceable between said primary and said secondary shaft, two friction wheels rockably mounted on said gear shaft in engagement with the lateral faces of said fraction discs, fluid-actuated means for forcing said wheels against said discs, a source of fluid under pressure communicating with said fluid actuated means, and means responsive to the transmitted momentum to vary the pressure of said fluid in order to increase the pressure between said wheels and discs at increasing momentum.

2. A variable speed changing gear comprising in combination, a casing, a primary shaft and a secondary shaft mounted in said casing, a friction disc on said primary shaft, a second friction disc on said secondary shaft, said discs being located substantially in a common plane and having a thickness decreasing towards the periphery, a gear shaft located between said primary and said secondary shaft in parallel relation thereto and being mounted in a frame displaceable between said primary and said secondary shaft, two friction wheels rockably mounted on said gear shaft in engagement with the lateral faces of said friction discs, fluid-actuated means for forcing said wheels against said discs, a source of fluid under pressure communicating with said fluid actuated means, one of said friction discs being rotatably mounted on its shaft, coupling means on said last-mentioned shaft to transmit the rotation of the shaft to said rotatably mounted friction disc, said coupling means being yieldable to permit relative movement between said rotatably mounted disc and its shaft in dependance upon the momentum of that shaft, and means responsive to relative movement between said shaft and its rotatably mounted disc to vary the pressure of said fluid in order to increase the pressure between said wheels and discs at increasing momentum.

3. A variable speed changing gear comprising in combination, a casing, a primary shaft and a secondary shaft mounted in said casing, a friction disc on said primary shaft, a second friction disc on said secondary shaft, said discs being located substantially in a common plane and having a thickness decreasing towards the periphery, a gear shaft located between said primary and said secondary shaft in parallel relation thereto and being mounted in a frame displaceable between said primary and said secondary shaft, two friction wheels rockably mounted on said gear shaft in engagement with the lateral faces of said friction discs, fluid-actuated means for forcing said wheels against said discs, one of said friction discs being rotatably mounted on its shaft, cam means on said rotatably mounted disc, at least one piston slidably mounted on said last-mentioned shaft and constructed and arranged to cooperate with said cam means and actuated by the pressure fluid, an outlet opening for said pressure fluid, said outlet opening being controlled by said piston such that its area decreases at increasing momentum.

4. A variable speed changing gear comprising in combination, a casing, a primary shaft and a secondary shaft mounted in said casing, a friction disc on said primary shaft, a second friction disc on said secondary shaft, said discs being located substantially in a common plane and having a thickness decreasing towards the periphery, a gear shaft located between said primary and said secondary shaft in parallel relation thereto and being mounted in a frame displaceable between said primary and said secondary shaft, two friction wheels rockably mounted on said gear shaft in engagement with the lateral faces of said friction discs, fluid-actuated means for forcing said wheels against said discs, a source of fluid under pressure communicating with said fluid actuated means, and means responsive to the transmitted momentum to vary the pressure of said fluid in order to increase the pressure between said wheels and discs at increasing momentum, and means connected to said gear shaft constructed and arranged to increase the fluid pressure in the fluid-actuated means when said shaft is in its end position nearest the primary shaft.

5. A variable speed changing gear comprising in combination, a casing, a primary shaft and a secondary shaft mounted in said casing, a friction disc on said primary shaft, a second friction disc on said secondary shaft, said discs being located substantially in a common plane and having a thickness decreasing towards the periphery, a gear shaft located between said primary and said secondary shaft in parallel relation thereto and being mounted in a frame displaceable between said primary and said secondary shaft, two friction wheels rockably mounted on said gear shaft in engagement with the lateral faces of said friction discs, fluid-actuated means for forcing said wheels against said discs, a source of fluid under pressure communicating with said fluid actuated means, and means responsive to the transmitted momentum to vary the pressure of said fluid in order to increase the pressure between said wheels and discs at increasing momentum and means connected to said gear shaft, said last named means comprising a throttling device for the fluid flow actuated by the displacement of the gear shaft so that the fluid pressure increases in the fluid-actuated means when said shaft is in its end position nearest the primary shaft.

SVEN BERNHARD RENNERFELT.

REFERENCES CITED

The following references are of record in the file of this patent:

UNITED STATES PATENTS

| Number | Name | Date |
|---|---|---|
| 766,438 | Gardner | Aug. 2, 1904 |
| 849,051 | Churchward | Apr. 2, 1907 |
| 2,509,940 | Rennerfelt | May 30, 1950 |

FOREIGN PATENTS

| Number | Country | Date |
|---|---|---|
| 143,686 | Switzerland | Nov. 30, 1930 |